United States Patent
Su et al.

(10) Patent No.: US 8,997,259 B2
(45) Date of Patent: Mar. 31, 2015

(54) METHOD AND APPARATUS OF TUNING A SCANNING PROBE MICROSCOPE

(71) Applicant: Bruker Nano, Inc., Santa Barbara, CA (US)

(72) Inventors: Chanmin Su, Ventura, CA (US); Paul Silva, Goleta, CA (US); Lin Huang, Goleta, CA (US); Bede Pittenger, Santa Barbara, CA (US); Shuiqing Hu, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 2 days.

(21) Appl. No.: 13/674,774

(22) Filed: Nov. 12, 2012

(65) Prior Publication Data
US 2013/0125269 A1   May 16, 2013

Related U.S. Application Data

(60) Provisional application No. 61/558,970, filed on Nov. 11, 2011.

(51) Int. Cl.
| | |
|---|---|
| *G01Q 30/10* | (2010.01) |
| *G01Q 30/00* | (2010.01) |
| *G01Q 30/04* | (2010.01) |
| *B82Y 35/00* | (2011.01) |
| *G01Q 60/34* | (2010.01) |

(52) U.S. Cl.
CPC ............... *G01Q 30/00* (2013.01); *G01Q 30/04* (2013.01); *B82Y 35/00* (2013.01); *G01Q 60/34* (2013.01)

USPC .................................... 850/13; 850/50; 73/105

(58) Field of Classification Search
USPC ............................ 850/13, 33, 38, 50; 73/105
See application file for complete search history.

(56) References Cited

U.S. PATENT DOCUMENTS

| | | | | |
|---|---|---|---|---|
| 6,823,724 | B1 * | 11/2004 | Kobayashi et al. | 73/105 |
| 7,748,260 | B2 * | 7/2010 | Su et al. | 73/105 |
| 8,205,487 | B2 * | 6/2012 | Rice et al. | 73/105 |
| 8,448,502 | B2 * | 5/2013 | Jesse et al. | 73/105 |
| 2006/0191329 | A1 | 8/2006 | Adderton et al. | |
| 2009/0260113 | A1 | 10/2009 | Rice et al. | |
| 2011/0167524 | A1 | 7/2011 | Hu et al. | |

OTHER PUBLICATIONS

Pittenger et al. "Quantitative Mechanical Property Mapping at the Nanoscale With Peakforce QNM", Oct. 2010, Application Note Veeco Instruments Inc., pp. 1-11. See Abstract; pp. 3-10 and Figures 1-7.

Poggi et al. Measuring the Compression of a Carbon Nanospring, Feb. 24, 2004, Nano Letters, vol. 4, No. 6, pp. 1009-1016. See Abstract; pp. 1010-1014 and Figures 1-6.

(Continued)

*Primary Examiner* — Kiet T Nguyen
(74) *Attorney, Agent, or Firm* — Boyle Fredrickson S.C.

(57) ABSTRACT

An apparatus and method of automatically determining an operating frequency of a scanning probe microscope such as an atomic force microscope (AFM) is shown. The operating frequency is not selected based on a peak of the amplitude response of the probe when swept over a range of frequencies; rather, the operating frequency is selected using only peak data corresponding to a TIDPS curve.

20 Claims, 9 Drawing Sheets

(56) References Cited

OTHER PUBLICATIONS

U Rabe et al. "Influence of the Cantilever Holder on the Vibrations of AFM Cantilevers", Published Dec. 12, 2006, Nanotechnology, Institute of Physics Publishing, pp. 1-9.

Ohler et al. "Cantilever Spring Constant Calibration Using Laser Doppler Vibrometry", Review of Scientific Instruments 78, Published Jun. 5, 2007, American Institute of Physics, pp. 1-5.

* cited by examiner

METHOD AND APPARATUS OF TUNING A SCANNING PROBE MICROSCOPE

CROSS-REFERENCE TO RELATED APPLICATION

This application claims priority under 35 U.S.C. §119(e) to U.S. Provisional Patent Application Ser. No. 61/558,970, filed on Nov. 11, 2011, the entirety of which is expressly incorporated by reference herein.

BACKGROUND OF THE INVENTION

1. Field of the Invention

The present invention is directed to scanning probe microscopes (SPMs), including atomic force microscopes (AFMs), and more particularly, to tuning the AFM for optimum operation.

2. Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 1. An AFM 10 employs a probe device 12 including a probe 17 having a cantilever 15. A scanner 24 generates relative motion between the probe 17 and a sample 22 while the probe-sample interaction is measured. In this way, images or other measurements of the sample can be obtained. Scanner 24 is typically comprised of one or more actuators that usually generate motion in three mutually orthogonal directions (XYZ). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

In a common configuration, probe 17 is often coupled to an oscillating actuator or drive 16 that is used to drive probe 17 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 17 to oscillate. The probe-sample interaction is typically controlled via feedback by controller 20. Notably, the actuator 16 may be coupled to the scanner 24 and probe 17 but may be formed integrally with the cantilever 15 of probe 17 as part of a self-actuated cantilever/probe.

Often, a selected probe 17 is oscillated and brought into contact with sample 22 as sample characteristics are monitored by detecting changes in one or more characteristics of the oscillation of probe 17, as described above. In this regard, a deflection detection apparatus 25 is typically employed to direct a beam towards the backside of probe 17, the beam then being reflected towards a detector 26, such as a four quadrant photodetector. The deflection detector is often an optical lever system such as described in Hansma et al. U.S. Pat. No. RE 34,489, but may be some other deflection detector such as strain gauges, capacitance sensors, etc. The sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are processed by a signal processing block 28 (e.g., to determine the RMS deflection of probe 17). The interaction signal (e.g., deflection) is then transmitted to controller 20, which processes the signals to determine changes in the oscillation of probe 17. In general, controller 20 determines an error at Block 30, then generates control signals (e.g., using a PI gain control Block 32) to maintain a relatively constant interaction between the tip and sample (or deflection of the lever 15), typically to maintain a setpoint characteristic of the oscillation of probe 17. The control signals are typically amplified by a high voltage amplifier 34 prior to, for example, driving scanner 24. For example, controller 20 is often used to maintain the oscillation amplitude at a setpoint value, $A_s$, to insure a generally constant force between the tip and sample. Alternatively, a setpoint phase or frequency may be used. Controller 20 is also referred to generally as feedback where the control effort is to maintain a constant target value defined by the setpoint.

A workstation 40 is also provided, in the controller 20 and/or in a separate controller or system of connected or stand-alone controllers, that receives the collected data from the controller 20 and manipulates the data obtained during scanning to perform data manipulation operating such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation is accomplished by moving the sample and/or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one practical mode of AFM operation, known as TappingMode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation. Alternative feedback arrangements keep the phase or oscillation frequency constant. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs, may be used herein to refer to either the microscope apparatus or the associated technique, e.g., "atomic force microscopy."

TappingMode AFM is a lower force technique and is the most widely used mode of AFM operation to map sample surfaces, especially for delicate samples. The typical force of the tip on the sample is about a few nN to tens of nN. Again, by oscillating the tip, rather than dragging the tip, the shear forces are minimized. That said, TappingMode AFM suffers from a drawback in that it is difficult to control the normal force acting on the sample surface. The user typically tries to select a setpoint that is only a small variation from the free air deflection/amplitude of the probe in order to minimize tip-sample interaction forces to get the best reproduction of the sample profile. The dilemma, especially for soft samples, is that if the imaging force is too low, the tip will not track the sample properly (i.e., maintain interaction with the sample during the scan), while if too high, damage/deformation of the sample may lead to an image that does not accurately reflect surface topography. Overall, the better this force can be controlled (i.e., the lower it can be maintained) the less chance of sample and/or tip damage, and thus resolution can be improved. And in this regard, an appropriate operating frequency, as well as amplitude and phase, needs to be selected for optimum operation.

More specifically, in order to operate in TappingMode (and variants thereof, such as PFT Mode), the AFM needs to provide efficient probe control. To do so, the frequency of oscillation, as well as the amplitude must be properly selected. Ideally, the probe is driven to oscillate at or about its fundamental resonant frequency for optimum AFM operation. Because the fundamental resonant frequency is unknown for each probe (even among probes fabricated from the same substrate (wafer)) and application, the operator of the AFM in TappingMode needs to initially determine this value. Classically, the amplitude response of the probe is plotted as a function of frequency as the frequencies are swept over a range. The resulting plot (sometimes referred to herein as an amplitude response curve) would typically include one or more amplitude peaks. It has been generally understood that one of these peaks, the largest typically, corresponds to the fundamental resonant frequency of the probe. The user would also adjust the drive amplitude to achieve the desired oscillation amplitude for the user's application. The user would do the same for the phase of the drive.

With respect to the selection of the peak, this method of determining the operating frequency is well accepted in the AFM community, and in many cases, it produces an accurate result. For instance, for operation in air, in which the Q of the cantilever is large, the amplitude response curve typically includes a sharp peak that is indicative of the fundamental resonant frequency of the probe. For operation in fluid, however, in which the Q is much lower due to fluid damping, the peak associated with the probe resonant frequency is wide and thus can be difficult to identify.

This tuning process has been automated in modern instruments, with start and end frequencies selected by the user, and the system identifying the highest amplitude peak associated with probe resonance. As noted above, known "auto-tune" algorithms have proven to be robust for TappingMode in air. This is primarily due to the fact that the quality factor (Q) of the probe is highest in air and therefore the assumption regarding the largest peak 52 of the frequency swept amplitude response 50 corresponds to the fundamental resonant frequency of the probe. (See, e.g., FIG. 2) The vertical line 54 represents the actual operating frequency of the probe due to a preset offset selected by the user. The offset is often positioned to the left of the largest peak of the tuning curve (i.e., amplitude response), at a lower frequency. This offset works to counter the damping affects experienced by the probe when the probe approaches the sample surface, thus allowing the system to maintain stable operation.

Though capable of providing stable operation, known automatic tuning methods also have drawbacks. For instance, the user defined parameters for conducting the tune may create problems. In one case, the user sets Start and/or End frequencies for the sweep. If, for example, the probe has a fundamental resonant frequency of 60 kHz, and the user sets the End frequency at 500 kHz, the automated tuning function may set the drive frequency to around 400 kHz, which exhibits an amplitude peak at an overtone frequency, rather than at the fundamental resonance.

Moreover, the setup of the AFM instrument may create problems identifying the resonance of the probe. For instance, the mechanical coupling between the probe holder and the probe substrate is often not ideal (even a small particle between the substrate and probe holder can compromise the system's ability to identify the probe resonance). If so, the amplitude response may include multiple peaks that make it difficult for the auto-tune algorithm to distinguish the probe resonant frequency. These peaks may also be caused by vibration of parts of the AFM other than the cantilever of the probe. In the end, the highest peak selected by the automatic tuning method may not correspond to the probe oscillation at all. See, for example, FIG. 3 in which a tuning curve 60 shows the fundamental resonant frequency of the probe at a peak 62 corresponding to a frequency of about 1.67 MHz, even though a larger peak 64 of the tuning curve corresponds to a frequency of about 1.85 MHz. Operating at this latter frequency, which would be selected by a typical auto-tune algorithm, would most likely prevent stable operation of the AFM.

For a discussion regarding miscellaneous resonances present in an AFM environment, please see, Rabe et al., *Influence of the cantilever holder on the vibrations of AFM cantilevers*, Nanotechnology 18 (2007).

Moreover, when operating TappingMode in fluid, multiple peaks (and peaks which are more rounded and therefore less easily correlated to the fundamental resonant frequency of the probe) are often present in the swept amplitude response (tuning curve) due to fluid damping of the cantilever (i.e., cantilever Q is smaller). Again, the highest peak in the tuning curve may not necessarily correspond to the resonant frequency of the probe. (See, e.g., FIG. 4 in which the largest peak 72 of the tuning crave 70 at about 200 kHz does not correspond to the fundamental resonant frequency of the probe.)

In all these cases, the automatic tuning method is at risk of failing. And if the probe is driven at a frequency other than the resonant frequency, poor probe response can lead to the acquisition of poor SPM images. In addition, when operating significantly off resonance, probe tips and/or samples can be damaged due to poor force control. Unfortunately, it is not always obvious to the user that the tune was not performed correctly. Up until now, it has been understood that identifying the largest peak of the frequency swept amplitude response of the probe provided the best indication of the fundamental resonant frequency of the probe and thus the proper operating frequency.

Another method of identifying one of characteristics of the AFM probe involves measuring the thermally induced response of the probe. This technique is most often used to determine the spring constant of the probe, and includes plotting the displacement power spectrum as a function of frequency. Unlike a typical auto-tune apparatus and method such as that described above, in which a piezo-stack actuator is employed to drive the probe cantilever into oscillation in response to a drive signal, the only drive force to the cantilever is passive thermal energy, when using the thermal technique. As the probe responds to the thermal energy input, the probe deflects and the system captures the deflection signal with sampling rate of up to 50 MHz and does so for a selected period of time. After collecting the thermal response data in this way, a software module may be provided to fit the peak in the resulting curve with, for example, a simple harmonic model. The result (80 in FIG. 5) may be integrated to obtain the mean square amplitude. From this, the user can calculate the cantilever spring constant value while also gleaning resonant frequency and Q value information associated with the cantilever. See, for instance, B. Ohler, *Cantilever spring constant calibration using laser Doppler vibrometry*, Review of Scientific Instruments 78, 063701 2007.

Notably, generating a thermally induced displacement power spectrum curve related to an AFM probe is a computationally intense endeavor. Nonetheless, such thermal plots may be used in conjunction with the conventional tuning curves (described above) as a "check" to qualify certain AFM functions, such as automatic probe exchange apparatus and methods. In a typical AFM instrument, however, the thermal power and the operating frequency tuning function are separate and not used at the same time.

Because of the problems associated with imperfect AFM setup (e.g., mechanical resonances other than that of the oscillating probe being introduced) and challenging imaging environments (e.g., fluid) a more reliable solution for identifying an operating frequency that yields robust AFM operation was needed.

SUMMARY OF THE INVENTION

In the present preferred embodiments, also known as the SmartTune algorithm and apparatus, conventional automatic tuning of an atomic force microscope has been improved without having to rely on a standard tuning curve (i.e., frequency swept amplitude response of an oscillating probe). Rather, the preferred embodiments take advantage of high speed processing hardware and software to rapidly generate a thermally induced displacement power spectrum (TIDPS) having a peak that substantially corresponds to the fundamental resonant frequency of the probe. In this way, the problems associated with conventional tuning curves (described above) can be substantially eliminated. In fact, contrary to accepted knowledge in the AFM field, generating a standard tuning curve is not necessary to identify an ideal operating frequency for the AFM at all, given that it has now been determined that the thermal peak provides a more reliable indication of the fundamental resonant frequency of the probe. Moreover, collecting thermal data for AFM tuning has been made commercially practical with the present design.

The SmartTune algorithm and apparatus collects thermal data, fits the data with a simple harmonic oscillator, and determines the resonant frequency of the cantilever from the fitted peak. In this way, the algorithm adjusts the drive frequency, amplitude, and phase values based on the thermal data and amplitude response data for robust operation. Preferably, the fitted curve of the thermal data is displayed to the user together with an auto-tune curve (frequency swept amplitude response). With the more reliable indication of fundamental resonant frequency of the probe, concerns regarding not operating at resonance are greatly lessened.

The result is an improvement to known automatic resonant frequency tuning problems, including when a conventional tuning curve exhibits multiple peaks, e.g., for the case in which the user is performing AFM measurements in fluid. In the preferred embodiments, automatic tuning is provided but is based on one or more TIDPSs, possibly displayed in a window also displaying a conventional tuning curve. The overlayed tuning curve may serve as a warning message for a user if the user sees the TIDPS peak and the auto-tune peak disposed at different frequencies.

Since the probe is driven only with thermal energy, the highest peak in the TIDPS is the closest approximation of the true fundamental resonance peak of the cantilever whether the cantilever is in air or in fluid, assuming a sufficient S/N (signal-to-noise) ratio. A high background peak at low frequency is typically not a problem. In the end, the preferred embodiments operate contrary to conventional AFM practice in which a frequency swept amplitude response curve is always used to select the AFM operating frequency.

In accordance with a first aspect of the preferred embodiments, a method of operating an SPM includes tuning the SPM to determine an operating frequency of a drive of the SPM without detecting an amplitude response of an oscillating probe over a range of frequencies.

In another aspect of the preferred embodiments, a method of operating an SPM includes the tuning step which includes generating a TIDPS of the SPM to generate a TIDPS curve and identifying the operating frequency based only on a peak associated with the TIDPS curve. The peak of the TIDPS curve corresponds to a fundamental resonant frequency of the oscillating probe.

According to another aspect of the preferred embodiments, a method of operating an SPM includes the performing step which includes a high speed data capture (HSDC) to generate HSDC data, and preferably includes using an FPGA architecture.

In another aspect of the preferred embodiments, a method of operating an SPM includes the high speed data capture which includes a capture rate greater than 1 MHz and a duration less than 500 ms, and more preferably, the capture rate is greater than 5 MHz and the duration is less than 250 ms.

According to another aspect of the preferred embodiments, the method of operating an SPM includes the performing step which includes executing a Fast Fourier Transform on the HSDC data to generate FFT data. In addition the method includes curve fitting the FFT data.

A SPM configured in accordance with the preferred embodiments the curve fitting step includes using a simple harmonic oscillator (SHO) over a first range of frequencies to generate a curve fitted plot. Notably, the curve fitted plot includes the peak.

In another aspect of the preferred embodiments, the method further includes a second curve fitting step over a second range of frequencies, the second range of frequencies being smaller than the first range of frequencies and spanning a selected amount relative to a frequency at the peak.

According to another aspect of the preferred embodiments, the method further includes using a peak offset value to determine the operating frequency of the SPM drive. The peak offset value is input by an SPM operator via a user interface of the SPM.

In another aspect of the preferred embodiments, the method further includes generating oscillatory motion in a probe over a range of frequencies, and plotting an amplitude response of the probe over the range of frequencies so as to determine an amplitude and a phase of the drive. The amplitude response includes at least one peak, and wherein the operating frequency does not correspond to any peak of the at least one peak.

According to a further aspect of the preferred embodiments, a method of operating a SPM includes a scanning probe microscope (SPM) includes a probe that deflects in response to thermal energy; and a detector that detects the deflection. A fast thermal spectrum module coupled to the detector to generate a TIDPS plot is also provided. Importantly, the operating frequency of the SPM is determined based only on the TIDPS plot.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Contrary to known automatic tuning methods and apparatus used in connection with AFM operation, the preferred embodiments utilize only a thermally induced displacement power spectrum (TIDPS) to identify the resonant frequency of the AFM probe. The technique described herein allows the user to operate the AFM at an optimum drive frequency without the drawbacks associated with using conventional tuning curves, and with no human judgment. Prior to the present preferred embodiments, to tune an AFM, the user would always analyze (or call an auto-tune algorithm to analyze) the frequency swept amplitude response of the probe. By generating a TIDPS curve and considering only the peak(s) of that curve, the preferred embodiments avoid entirely the drawbacks associated with using conventional tuning curves to select AFM operating frequency.

Figure 1:
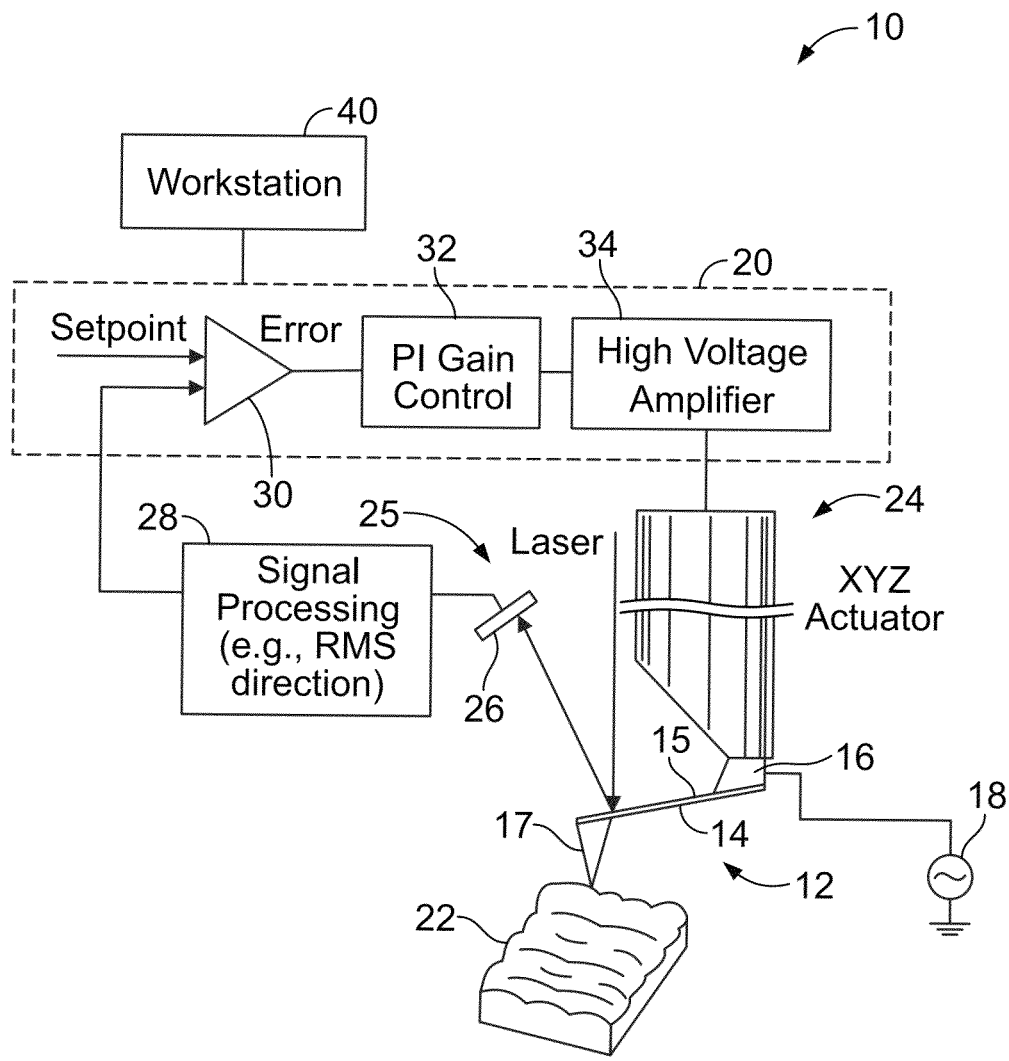
FIG. 1 is a block diagram illustrating a prior art atomic force microscope (AFM)
Figure 2:
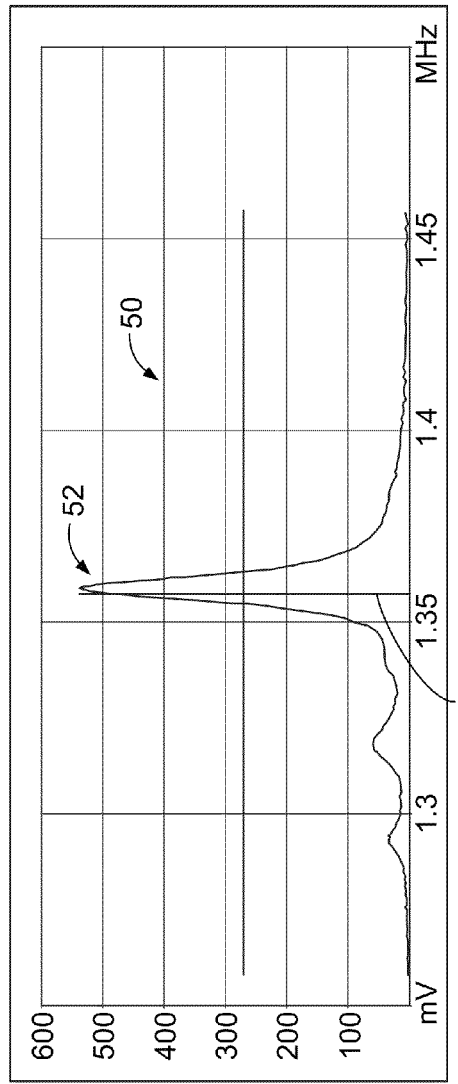
FIG. 2 is a partially schematic plot of a tuning curve produced according to a prior art automatic tuneing algorithm.
Figure 3:
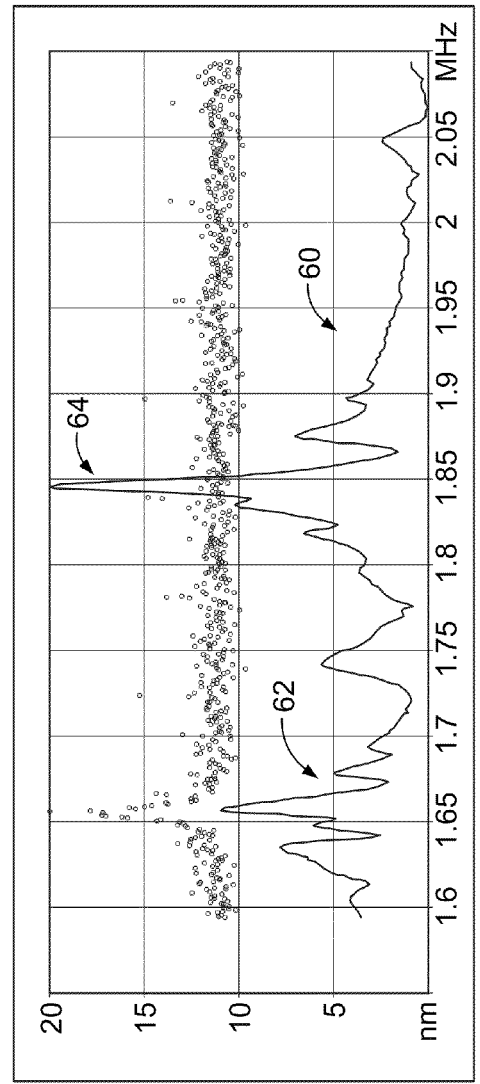
FIG. 3 is a partially schematic plot of a tuning curve similar to the plot shown in FIG. 1, illustrating multiple resonance peaks due to vibration of AFM components (e.g., Si substrate vibration) other than the cantilever and its fundamental resonance.
Figure 4:
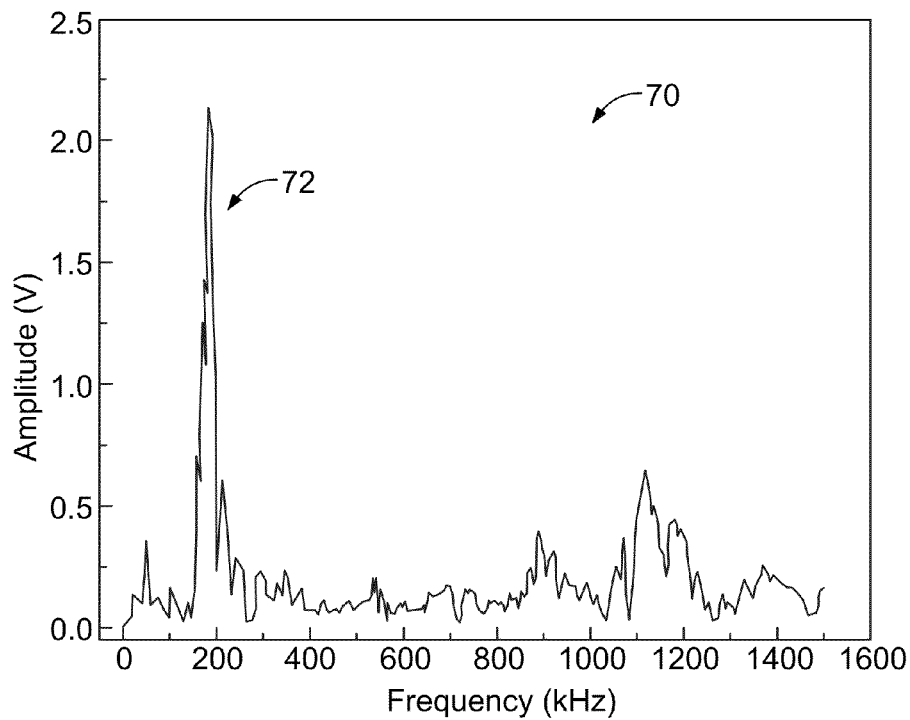
FIG. 4 is a partially schematic tuning curve similar to that shown in FIG. 2, illustrating the response of a probe operating in fluid.
Figure 5:
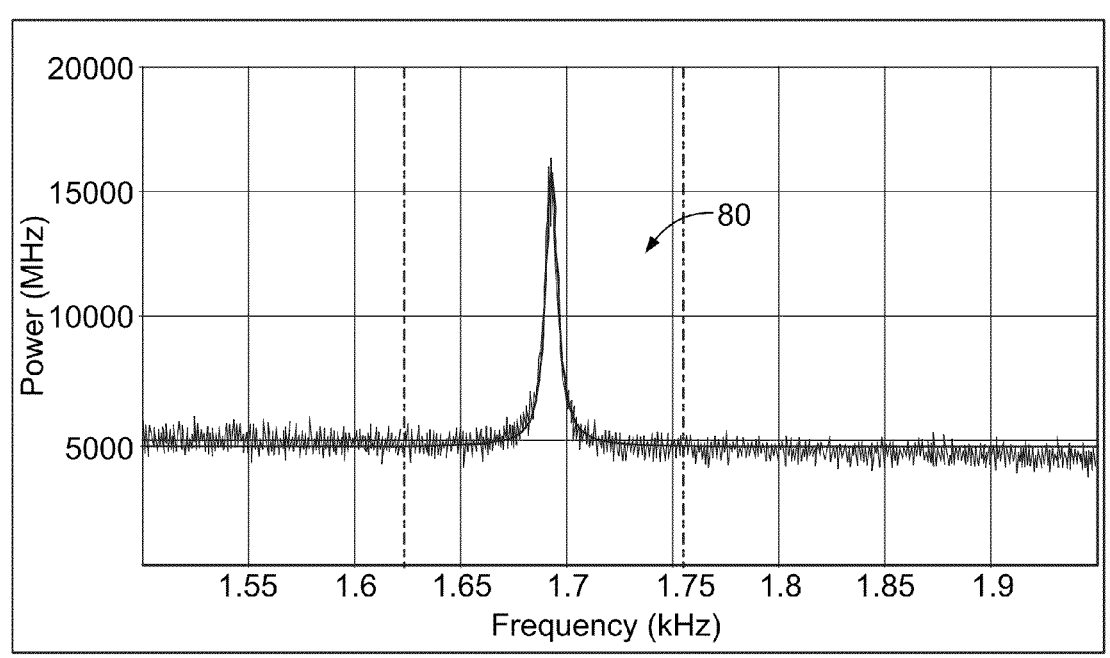
FIG. 5 is a partially schematic plot illustrating a thermally induced displacement power spectrum (TIDPS)
Figure 7:
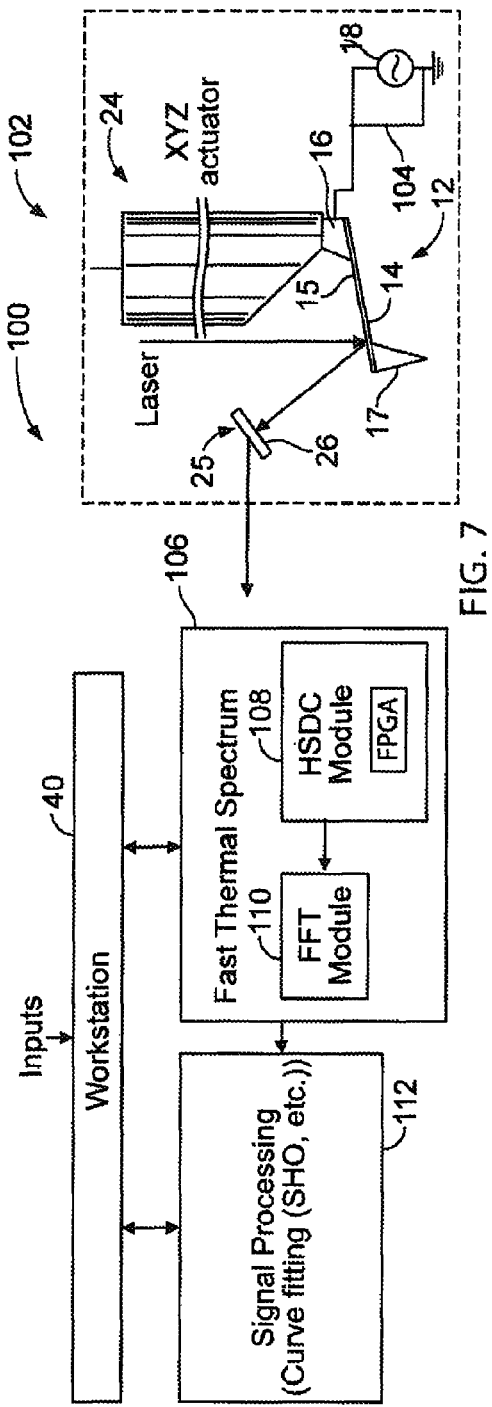
FIG. 7 is a block diagram of a tuning system according to a preferred embodiment, illustrating part of the head of the AFM shown in FIG. 1, and configured to perform the smart tune algorithm of the present invention.

Turning to FIG. 7, a system 100 for tuning an AFM 102 according to the preferred embodiments is shown. In contrast to conventional auto-tuning algorithms in which the piezoelectric actuator 16 (e.g., a piezo stack, FIG. 1) used to oscillate the probe during AFM operation is driven by a drive 18 so that the probe amplitude response can be measured over a range of frequencies, the preferred embodiments do not apply a signal to an actuator to drive the probe into oscillation. Rather, because the tuning algorithm of the preferred embodiments exclusively uses the thermal response of the probe to tune the AFM, the only drive force is the passive thermal energy provided, e.g., in the ambient environment.

More particularly, in this preferred embodiment, the conventional auto-tune algorithm which searches for the cantilever fundamental resonance frequency from a frequency swept amplitude response of an oscillating probe is not required. The operating frequency is selected solely on a thermal spectrum curve, in contrast to conventional AFM tuning procedures. Referring again to FIG. 7, an AFM head such as that illustrated in FIG. 1 including a piezoelectric tube 24 supporting a piezoelectric actuator 16 that drives a probe 12 is provided. In this case, the drive used to oscillate the probe during AFM operation is grounded (104) while generating the TIDPS. In this case, as is conventionally known, thermal energy is imparted to the probe (e.g., at ambient) and the deflection is measured using a sampling rate of up to 50 MHz over a selected period of time. The thermal energy causes deflection of the probe which is measured by detector 25 having an output that is communicated to a fast thermal spectrum (FTS) module 106. The FTS module operates by initiating a high speed data capture, preferably using FPGA architecture. A typical capture rate is less than 50 MHz and more specifically about 6.25 MHz over a selected duration (e.g., 200 ms, an amount of time sufficient to acquire enough data to illustrate the frequency corresponding to the peak, yet not so long that system performance is compromised).

In operation, Fast Thermal Spectrum processing block 106 receives the deflection data via a high speed data capture (HSDC) module 108. HSDC module 108 preferably includes FPGA-based architecture for efficient and high speed thermal data acquisition. It is this high speed data capture that makes using a TIDPS in the AFM tuning process viable. As noted previously, TIDPSs require significant computing power to generate the spectrum and therefore doing anything other than oscillating the probe and sweeping the frequencies to generate a corresponding auto-tune amplitude response was considered impractical.

FTS block 106 also includes an FFT (fast fourier transform) module 110 which is provided to condition the HSDC data for subsequent action by processing the raw thermal data and providing a rough frequency plot illustrating a peak at about the desired operating frequency.

Figure 6:
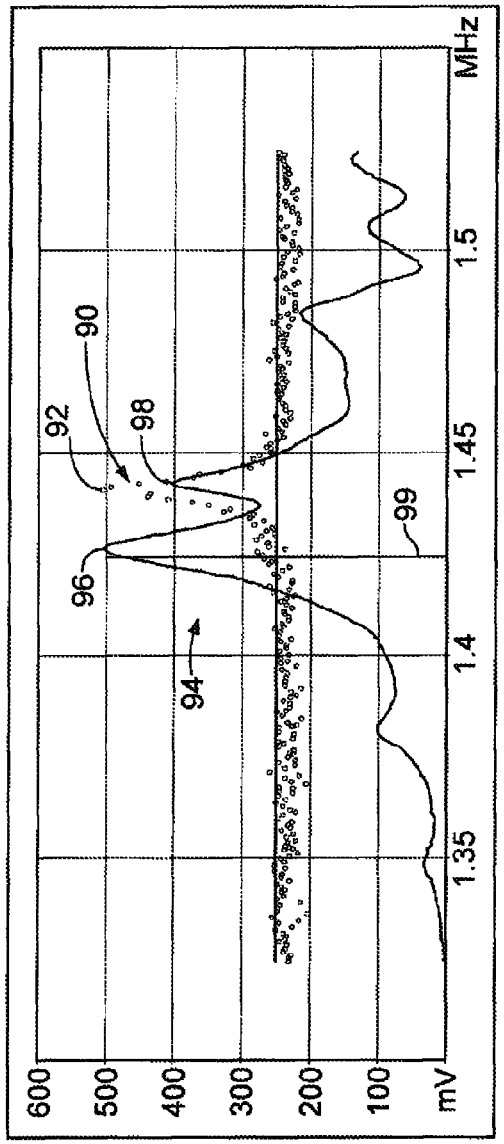
FIG. 6 is a partially schematic plot illustrating a MPS curve overlayed on a conventional multi-peak tuning curve, illustrating the difference between the peak typically selected by known automatic tuning algorithms for operating the AFM and the primary peak of a TIDPS used by the preferred embodiments.

A Signal Processing block 112 is provided downstream of FFT block 106 and receives FFT data and performs a curve fit of the corresponding peak in the TIDPS; for example, using a simple harmonic model (SHO-simple harmonic oscillator) or a Lorentzian model. The result may then be integrated to obtain a mean square amplitude, and once complete, a cantilever spring constant can be determined (formerly, the primary reason for measuring a thermal response in AFM). In the present case, however, the curve, such as curve 90 shown as a series of circles in FIG. 6, is used to deduce resonant frequency and "Q" values of the probe.

More particularly, a simple harmonic oscillator (SHO) is run on the FFT data using a limit on the frequency range of the fit to the user selected start and stop frequency parameters. In the preferred embodiments, if the end frequency is larger than the HSDC capture rate divided by 2 (also known as the Nyquist frequency), then the end frequency is preferably clipped to the Nyquist frequency. At this point, the curve fitted data can be used to identify a peak amplitude and an associated frequency, thereby providing an indication of the probe resonant frequency. Further details regarding the process steps of the smart tune (ST) algorithm are discussed further below in connection with FIG. 8.

Importantly, since in this case the probe is driven solely with thermal energy, the largest peak in the TIDPS curve is always the true fundamental resonant peak of the probe cantilever whether the probe is operating in air or in fluid (the effects of other mechanical resonances introduced to the system being minimized). This will be the case as long as the signal-to-noise ratio in the thermal spectrum curve is acceptable (i.e., sometimes there is a high background peak present at low frequencies). Notably, the TIDPS generated according to the preferred embodiments can be used as a quick check of a typical auto-tuning algorithm result. The peak associated with a TIDPS curve can be compared with the peak of the conventional auto-tuning curve used to select the operating frequency. This is illustrated in FIG. 6 in which peak 92 of thermal spectrum curve 90 is overlayed on a conventional tuning curve 94 having two peaks 96, 98. Known auto-tune algorithms when plotting a curve such as curve 94 will typically identify the largest peak (96 in this case) and base the selection of the AFM operating frequency thereon. Here that frequency is represented by vertical line 99 associated with peak 96 (with an offset). In this case, the standard tuning plot selects the wrong operating frequency. Peak 98 should be used, as confirmed by the thermal peak 92 positioned at about the same frequency. These curves illustrate the difference between the optimum operational frequency (associated with thermal peak 92) and a non-ideal, potentially problematic operational frequency most often selected by a known algorithm.

In the end, a difference between the peaks can serve as a warning to the user in the event that the conventional auto-tune algorithm selects the wrong peak, thereby potentially saving wasted imaging time, as well as minimizing the chance of AFM probe and/or sample damage. This technique can also be used to qualify the automatic tip-exchange process used in applicant's AFMs to determine whether the tip-exchange function successfully accomplishes installing a new probe.

Figure 8:
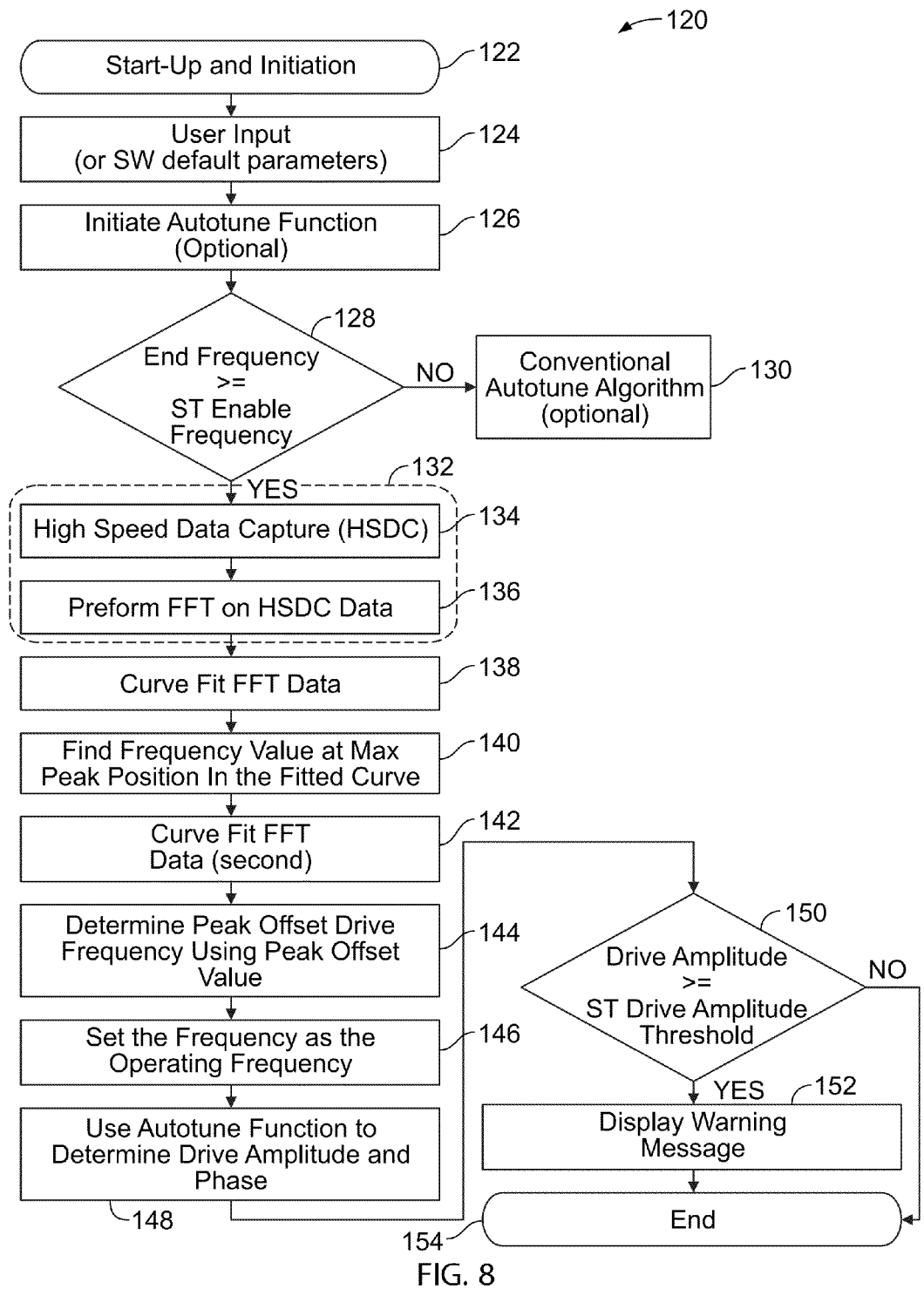
FIG. 8 is a flow chart illustrating a method of automatically tuning an AFM according to a preferred embodiment.

Referring next to FIG. 8, a smart tune algorithm 120 of the current embodiments is illustrated. After a startup and initiation step in Block 122, the user is asked to enter a number of parameters required to perform the tune in Block 124. If the SPM also includes a conventional auto-tune algorithm, one of these parameters can be a smart tune enable frequency (ST Enable) which is essentially a threshold or switch for calling the smart tune algorithm only when needed. Note that FIG. 8 is sufficiently broad to cover such a design but it is to be understood that the smart tune algorithm of the preferred embodiments is intended to operate entirely independently of a conventional auto-tune algorithm.

Figure 10:
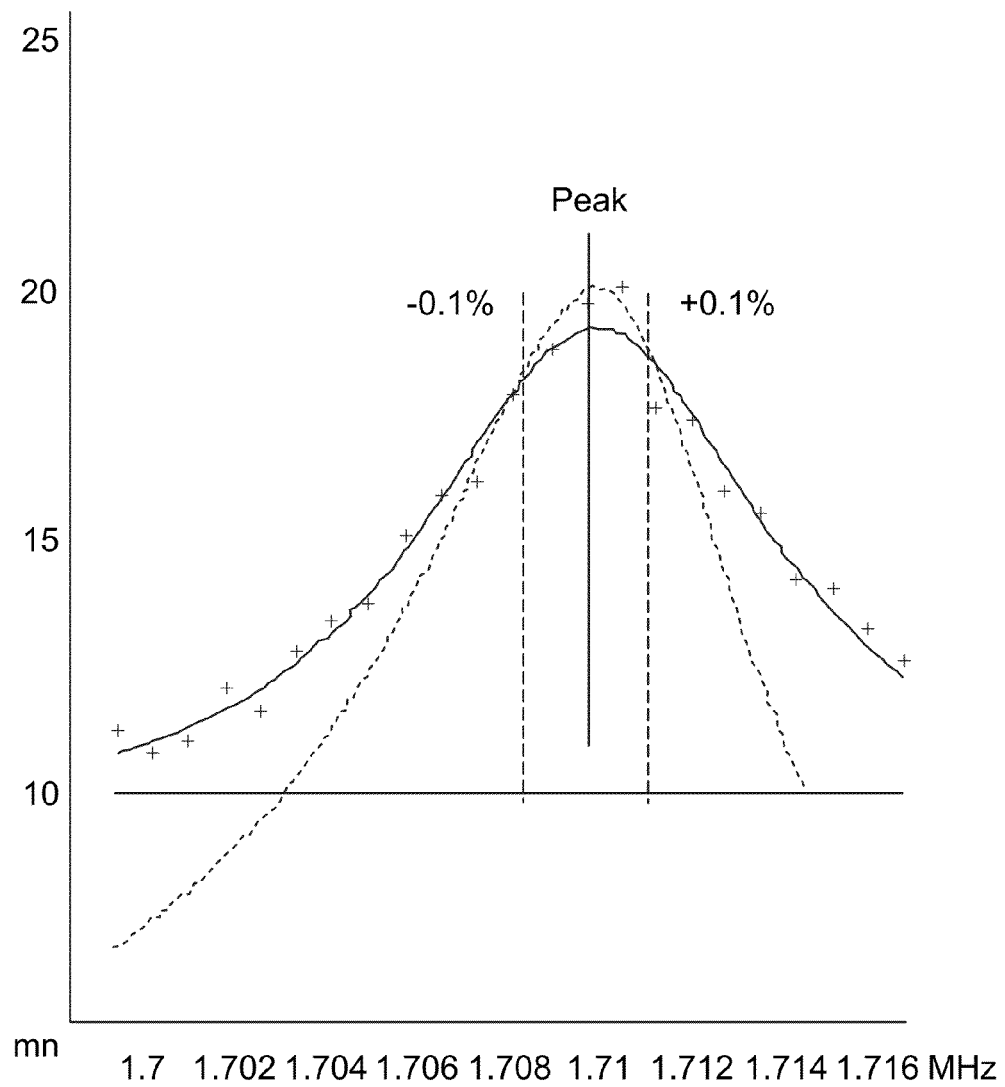
FIG. 10 is a partially schematic plot illustrating a curve fitting function at a narrowed frequency range once the smart tune algorithm identifies a potential operating frequency.

Other parameters include a smart tune filter frequency range (ST filter frequency range) the function of which is to narrow the range (over which a second curve fit is performed (described below) around the identified peak (e.g., plus/minus 10%), and a smart tune drive amplitude threshold (ST drive amplitude threshold) which provides a warning message if the drive amplitude is above the threshold (often the situation with a broken or mis-mounted probe). Also, a smart tune filter frequency range (ST Filter Freq. Range) is requested (e.g., plus/minus 0.1% as illustrated in FIG. 10), the function of which is to set a frequency range for a subsequent run of another curve fit around the peak frequency found in the first fit curve, thereby delivering a more accurate value of the resonant frequency.

Figure 9:
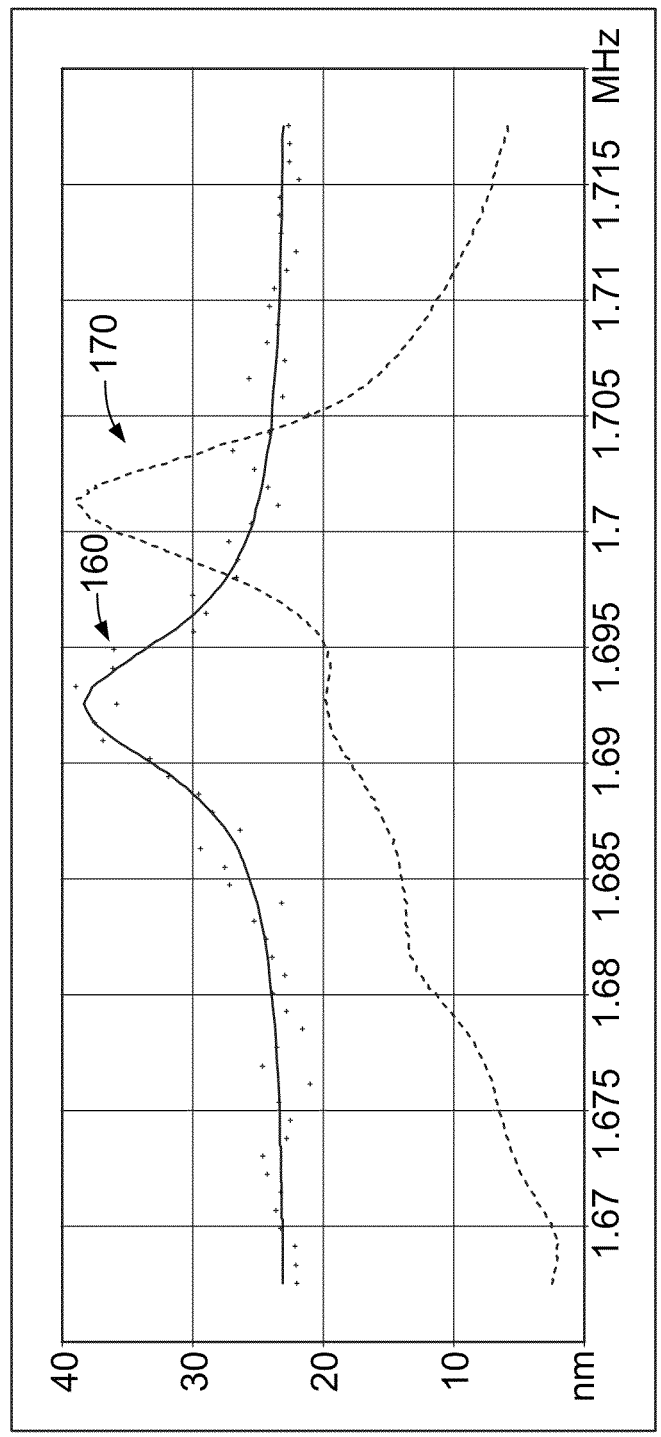
FIG. 9 is a partially schematic plot illustrating selection of a drive frequency using the SmartTune™ algorithm of the preferred embodiment.

Once the user has input the operational parameters, an auto-tune function may be initiated in Block 126, as is done in conventional practice. Again, this is an optional step and may be used as a check when compared to the subsequently generated TIDPS plot. Next, in Block 128, the ST algorithm determines whether the user selected end frequency is greater than or equal to the ST enable frequency. In the event that it is not, only the conventional auto-tune algorithm is executed in Block 130. If, on the other hand, the end frequency is greater than or equal to the ST enable frequency, a smart tune operation is performed to generate a TIDPS in Block 132. The fast thermal spectrum Block 132 includes, initially, a high speed data capture (HSDC) operation in Block 134, typically performed using a capture rate of about 50 MHz and a duration of around 200 milliseconds. Once the high speed data capture data step is complete, a fast fourier transform (FFT) is run on the HSDC data in Block 136. The output of the FFT run on the HSDC data is then plotted as curve 160, shown in FIG. 9 together with a conventional auto-tune curve 170. Next, a curve fit operation is performed in Block 138. Preferably, a simple harmonic oscillator is run on the data using the start and end frequency designations of the user as the fit range.

In Block 140, the smart tune algorithm determines the frequency value at the max peak position of the fitted curve. Once the frequency is identified, approximately, a second curve fit operation, preferably using a simple harmonic oscillator, is run in Block 142 after resetting the frequency range. This new range is identified by the user with the parameter "ST filter frequency range" value. The default value for the ST filter frequency range is in the range of about 10%. More particularly, in the event that the peak frequency is at about 1000 kHz, the range is set at plus or minus 10% around this peak. As a result, the curve fitting operation is performed over a range of about 900 kHz to 1100 kHz. This further refines the location of the peak and the corresponding frequency associated therewith.

Figure 11:
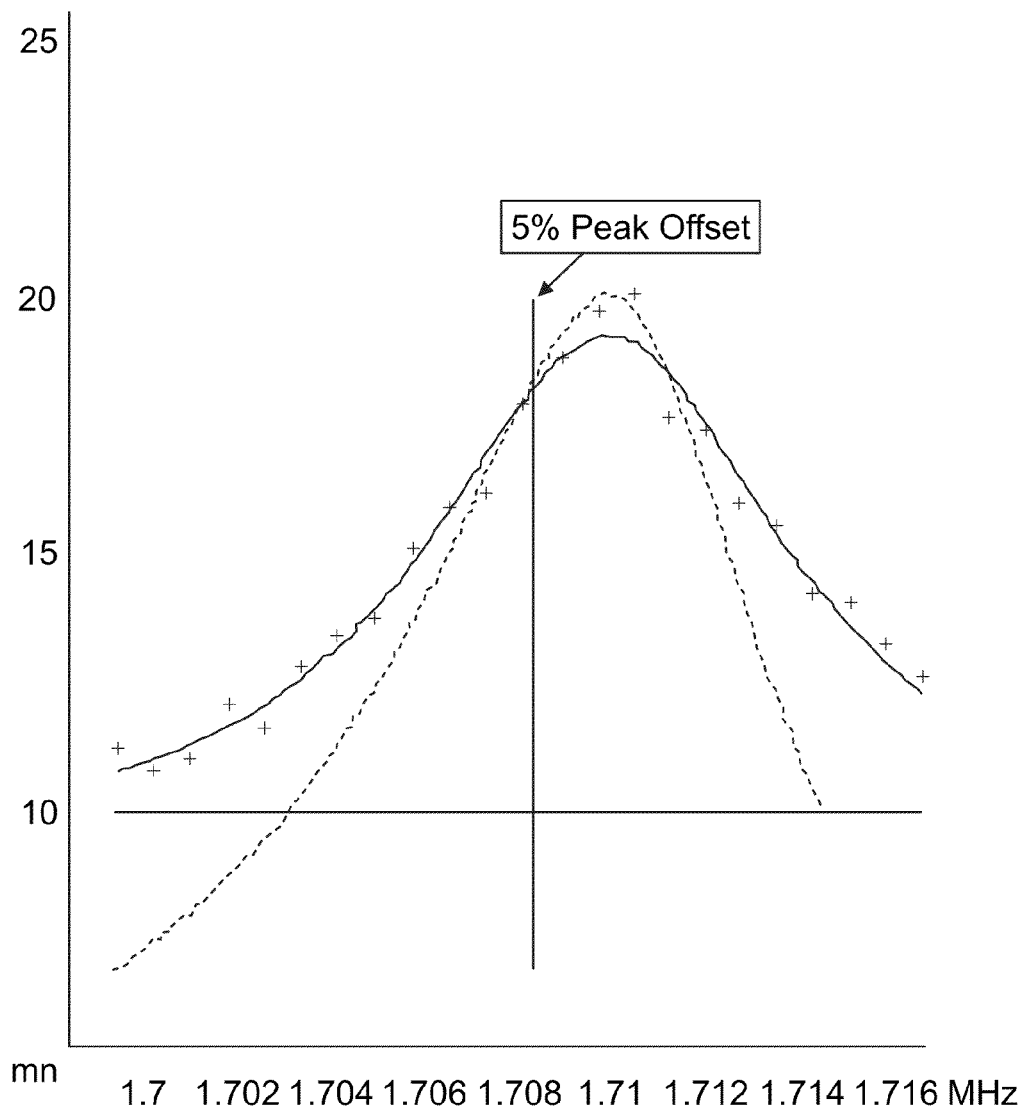
FIG. 11 is a partially schematic plot illustrating selection of an operating frequency corresponding to a peak identified by the smart tune algorithm, after implementing an offset.

To determine the final drive frequency, the operating frequency is offset in Block 144 according to the associated set parameter. In this regard, it is known that when a probe moves close to the sample surface, the amplitude peak tends to shift to the left on the plot used to determine the resonant frequency. This is due to air damping (fluid damping when operating in fluid). In essence, the peak offset helps to pre-shift the drive frequency to the low side of the frequency of the amplitude peak to compensate for damping effects. For example, if the peak value is 100 millivolts and the peak offset value is 5%, the algorithm determines a frequency value from the fitted curve output by Block 140 where the amplitude is maybe 95 millivolts. (See also FIG. 11) In all cases, the peak offset is determined based on the fitted curve of the thermal spectrum operation. It is important that the peak offset frequency is determined from the thermal spectrum data (160) instead of the amplitude response curve like 170 in FIG. 9. In the case of double peaks in the tune curve 202 shown in FIG. 12, if we choose the peak offset frequency is chosen not based on the thermal spectrum data, the current algorithm can set a non-ideal SPM operational frequency. At this point, the final drive frequency or operating frequency is identified and set in Block 146. This frequency is a close approximation of the fundamental probe resonant frequency. Again, this is accomplished without the user (or an auto algorithm) having to sift through multiple peaks in a conventional tuning curve which may or may not be resonances associated with the probe.

Continuing, in Block 148, a conventional auto-tuning algorithm may be used to determine the drive amplitude and phase. In this case, the start frequency and end frequency are set equal to the final drive or operating frequency and the peak offset is set to zero. Thereafter, the conventional auto-tuning algorithm is run. After determining the drive amplitude in this way, in the event that the drive amplitude is greater than or equal to the smart tune drive amplitude drive threshold, as determined in Block 150, a warning message is displayed in Block 152 if the condition is satisfied. At this point, the smart tune algorithm is completed the same as if there were no warning message situation. However, the user is warned that there could be potential problem if the user continues the operation. If, on the other hand, the drive amplitude is not greater than or equal to the ST drive amplitude threshold (determined in Block 150), operation of smart tune algorithm 120 is complete and the user is ready to image its sample with the AFM.

Figure 12:
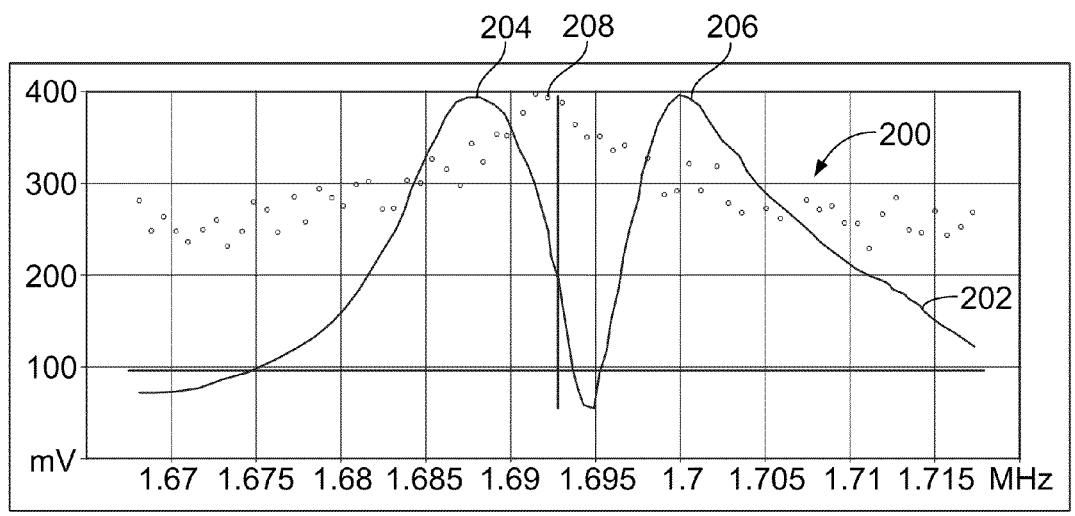
FIG. 12 illustrates an example of a complex case in which the smart tune algorithm of the preferred embodiments is employed to tune the AFM for robust operation when a conventional tuning curve (shown partially schematic) illustrates dual nearby peaks.
Figure 13:
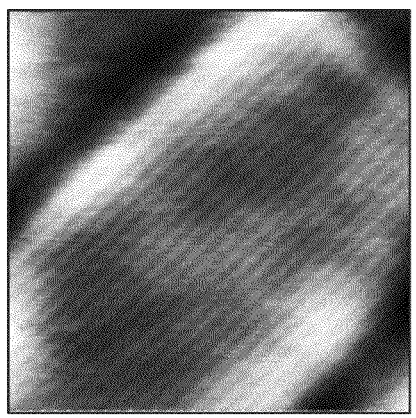
FIGS. 13 and 14 are AFM height and phase images generated while operating at a frequency identified by the smart tune algorithm, as shown in FIG. 12.
Figure 14:
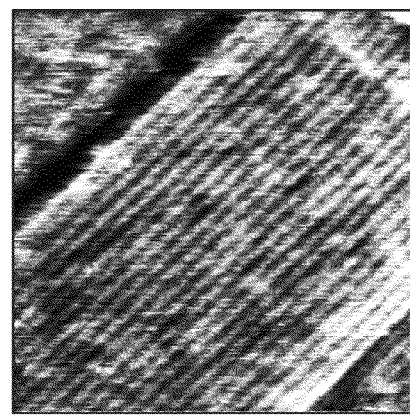

An illustration of an output of the present smart tune algorithm for a particularly difficult case is illustrated in FIGS. 12-14. In FIG. 12, HSDC thermal data is plotted on top of a conventional tuning curve having two large peaks (204, 206) separated by a narrow valley. It is noteworthy that the vertical line 210 passing through the peak 208 of the MPS curve 200 intersects the conventional tuning curve at a midpoint on the down slope in the valley between the two peaks of the tuning curve 202. Prior to the present preferred embodiments of tuning an AFM, operating at a frequency corresponding to this point on a conventional tuning algorithm would have been considered unacceptable to those in the AFM community. In fact, in this important case, even performing a check of the peaks acquired using a conventional tuning algorithm by comparing the conventional tuning peaks with a thermal peak would not cause either an auto algorithm or a user reviewing the peaks manually to pick the correct frequency shown at 210 given that there are no conventional tuning peaks in the range of the thermal peak at 210. However, it is indeed the proper operating frequency to generate quality AFM images such as that shown in FIGS. 13 and 14. In the event that the AFM is operated at one of the peaks of the auto-tune curve 202 shown in FIG. 12, the problems noted earlier concerning conventional tuning algorithms would occur, including potentially damaged samples or broken tips of the probes, and overall poor system performance, thus leading to a high likelihood of unacceptable sample data being acquired. Operating at the frequency associated with vertical line 210 according to the preferred embodiments obviates these issues.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A method of operating a scanning probe microscope (SPM) comprising:
   tuning the SPM to determine an operating frequency of a drive of the SPM without detecting an amplitude response of an oscillating probe over a range of frequencies.

2. The method of claim 1, wherein said tuning step includes generating a thermally induced displacement power spectrum (TIDPS) of the SPM to generate a TIDPS curve, and identifying the operating frequency based only on a peak associated with the TIDPS curve.

3. The method of claim 2, wherein the peak of the TIDPS curve corresponds to a fundamental resonant frequency of the oscillating probe.

4. The method of claim 2, wherein the generating step includes a high speed data capture (HSDC) to generate HSDC data.

5. The method of claim 4, wherein the high speed data capture includes using FPGA architecture.

6. The method of claim 5, wherein the high speed data capture includes a capture rate greater than 1 MHz and a duration less than 500 ms.

7. The method of claim 6, wherein the capture rate is greater than 5 MHz and the duration is less than 250 ms.

8. The method of claim 4, wherein the generating step includes executing a Fast Fourier Transform on the HSDC data to generate FFT data.

9. The method of claim 8, further comprising curve fitting the FFT data.

10. The method of claim 9, wherein the curve fitting step includes using a simple harmonic oscillator (SHO) over a first range of frequencies to generate a curve fitted plot, wherein the curve fitted plot includes the peak.

11. The method of claim 10, further comprising a second curve fitting step over a second range of frequencies, the second range of frequencies being smaller than the first range of frequencies and spanning a selected amount relative to a frequency at the peak.

12. The method of claim 2, further comprising using a peak offset value to determine the operating frequency of the SPM drive.

13. The method of claim 12, wherein the peak offset value is input by an SPM operator via a user interface of the SPM.

14. The method of claim 13, further comprising generating oscillatory motion in a probe over a range of frequencies, and plotting an amplitude response of the probe over the range of frequencies so as to determine an amplitude and a phase of the drive.

15. The method of claim 14, wherein the amplitude response includes at least one peak, and wherein the operating frequency does not correspond to any peak of the at least one peak.

16. A scanning probe microscope (SPM) comprising:
a probe;
a drive to cause the probe to oscillate;
a detector that detects deflection of the probe during operation of the SPM;
wherein the SPM determines an operating frequency of the drive without detecting an amplitude response of the oscillating probe over a range of frequencies.

17. The SPM of claim 16, wherein the probe deflects in response to thermal energy, and further comprising a fast thermal spectrum module coupled to the detector to generate a TIDPS curve, wherein the operating frequency of the SPM is determined based only on the TIDPS curve.

18. The SPM of claim 17, wherein the fast thermal spectrum (FTS) module includes a high speed data capture (HSDC) module that acquires thermal data from the detector.

19. The SPM of claim 18, wherein the HSDC module includes FPGA-based architecture.

20. The SPM of claim 18, wherein the HSDC module acquires data at a sampling rate that is between about 5 MHz and 50 MHz, and a sampling duration greater than 10 ms and less than 1000 ms.

* * * * *